United States Patent
Marlow et al.

(10) Patent No.: US 10,237,247 B2
(45) Date of Patent: *Mar. 19, 2019

(54) USER INTERFACE SYSTEMS AND METHODS FOR SECURE MESSAGE ORIENTED COMMUNICATIONS

(71) Applicant: Protected Mobility, LLC, McLean, VA (US)

(72) Inventors: William J. Marlow, Herndon, VA (US); Robert Cichielo, Asbury, NJ (US); Emil Sturniolo, Medina, OH (US); Paul Benware, Mendon, NY (US)

(73) Assignee: Protected Mobility, LLC, McLean, VA (US)

( * ) Notice: Subject to any disclaimer, the term of this patent is extended or adjusted under 35 U.S.C. 154(b) by 30 days.

This patent is subject to a terminal disclaimer.

(21) Appl. No.: 15/425,782

(22) Filed: Feb. 6, 2017

(65) Prior Publication Data
US 2017/0214665 A1 Jul. 27, 2017

Related U.S. Application Data

(63) Continuation of application No. 12/940,213, filed on Nov. 5, 2010, now Pat. No. 9,602,277.

(60) Provisional application No. 61/351,979, filed on Jun. 7, 2010.

(51) Int. Cl.
*H04L 9/00* (2006.01)
*H04L 29/06* (2006.01)
*H04L 9/08* (2006.01)
*H04W 12/02* (2009.01)
*H04W 12/04* (2009.01)

(52) U.S. Cl.
CPC ........ *H04L 63/0428* (2013.01); *H04L 9/0841* (2013.01); *H04W 12/02* (2013.01); *H04W 12/04* (2013.01); *H04L 2209/80* (2013.01)

(58) Field of Classification Search
CPC ................................................. H04L 63/0428
See application file for complete search history.

(56) References Cited

U.S. PATENT DOCUMENTS

| | | | | |
|---|---|---|---|---|
| 2009/0307142 | A1* | 12/2009 | Mardikar | G06Q 20/1085 705/72 |
| 2010/0020972 | A1* | 1/2010 | Baugher | G06F 21/606 380/255 |
| 2011/0117883 | A1* | 5/2011 | Drabo | H04W 12/02 455/411 |

* cited by examiner

*Primary Examiner* — Evans Desrosiers
*Assistant Examiner* — Syed M Ahsan
(74) *Attorney, Agent, or Firm* — Nixon & Vanderhye P.C.

(57) ABSTRACT

A convenient, easy to use ubiquitous secure communications capability can automatically encrypt and decrypt messages without requiring any special intermediating security component such as gateways, proxy servers or the like. Trusted/secure applications for the mobile workforce can significantly improve productivity and effectiveness while enhancing personal and organizational security and safety.

17 Claims, 12 Drawing Sheets

Example User Interfaces

Standard    Secure
FIG. 6A

Standard    Secure
FIG. 6C

Standard    Secure
FIG. 6B

Compose SMS    Compose Secure Txt
FIG. 6D

FIG. 7

Example Data Structures

Key Ring – Disk/Memory/Secure Storage

| Key Ring Element | Value |
|---|---|
| Contact | xxxx |
| Public Key | xxxx |
| Key Continuity Value | xxxx |
| Other | xxxx |

| Key Ring Element | Value |
|---|---|
| Contact | xxxx |
| Public Key | xxxx |
| Key Continuity Value | xxxx |
| Other | xxxx |

FIG. 8B

Example Data Structures

602(1)

| Contact Info | Value |
|---|---|
| Telephone number | xxxx |
| IP Address | xxxx |
| E-mail | xxxx |
| Unique | xxxx |
| Other | xxxx |

602(2)

| Contact Info | Value |
|---|---|
| Telephone number | xxxx |
| IP Address | xxxx |
| E-mail | xxxx |
| Unique | xxxx |
| Other | xxxx |

USER INTERFACE SYSTEMS AND METHODS FOR SECURE MESSAGE ORIENTED COMMUNICATIONS

CROSS-REFERENCE TO RELATED APPLICATIONS

This application is a continuation of U.S. patent application Ser. No. 12/940,213 filed Nov. 5, 2010; which claims benefit of U.S. Provisional Patent Application No. 61/351,979 filed Jun. 7, 2010. The disclosures of these prior applications are incorporated herein by reference.

STATEMENT REGARDING FEDERALLY SPONSORED RESEARCH OR DEVELOPMENT

None.

FIELD

The technology herein relates to secure communications, and more particularly to method and apparatus for providing end-to-end secure messaging between disparate portable devices without requiring intermediate secure network infrastructure.

BACKGROUND AND SUMMARY

All across the world, electronic communications is beginning to supplant and replace other communication forms. Portable computing devices have become ubiquitous. Users are now using such devices instead of more traditional means to communicate. It is now common for users to employ their wireless portable devices more for exchanging written or textual messages and photographs than for other tasks. Teenagers especially like text messaging, although texting has become extremely popular all across society.

While open and easy electronic communication between a wide range of users and user devices provides tremendous advantages, it also presents some challenges. One important challenge relates to privacy of communications.

For example, text messages (SMS) are currently one of the most highly vulnerable types of information a mobile workforce can send. With less than $100 worth of equipment, an attacker can intercept and clearly read just about any textual message sent from most portable devices. Yet, every day 2.5 billion text messages are sent in the United States alone. This lack of privacy can have serious consequences.

In one's personal life, a stalker or other undesirable person is now able to intercept and read messages sent from your portable device. Such messages can reveal your whereabouts, activities and future plans, creating opportunities for criminals to attack life, limb and property.

In the business world, employees cautioned to avoid communicating sensitive competitive information via electronic means often nevertheless insist on doing so because electronic communication is typically the most convenient form of communications when on the road, during meetings and in a variety of other situations.

In even more sensitive endeavors such as law enforcement, the military, government policymaking, customs and the like, undesired interception of sensitive information could have far-reaching consequences to our way of life.

Fortunately, powerful electronic encryption techniques exist for protecting electronic communications. Of course, codes and ciphers have been known since ancient times and have been used for electronic communications virtually since the time electronic communications came into existence. For example, during the American Civil War, it was common for both Federals and Confederates to encrypt their telegraph dispatches before transmission. In World War II, the allies achieved a great advantage when cryptographers at Bletchley Park cracked the Enigma code the Germans were using to encrypt sensitive radio dispatches. Since then, secure encryption algorithms based on public key cryptography and/or shared symmetric keys can be efficiently implemented on even low-capability computing devices to provide a high degree of data security. Depending on key length, a typical laptop computer can now encrypt communications in a way that makes it computationally infeasible for an attacker to break or crack the code within any reasonable amount of time.

While strong encryption algorithms are known and in wide use, not all users have access to them. One challenge is the wide array of different kinds of portable devices the average user uses for electronic communicating. Devices come in all forms: netbooks, tablets, cell phones, PDA's, laptops, and many other variations. People now often carry portable laptop or tablet computers or personal digital assistants mostly to allow them to exchange messages electronically. Such devices allow the seamless exchange of text and voice messages, emails, videos, photographs, audio recordings and a range of other electronic media. Many such devices are wireless, allowing information to be exchanged over a variety of different types of networks including for example local or wide area networks, the Internet, Wi-Fi, WiMax, cellular, and other wireless communication protocols and infrastructures. A business user may use three or four different devices (e.g., laptop computer, tablet computing device, PDA, cell phone, etc.), sometimes even simultaneously, to communicate with other users. Each device may use different forms of security, and some devices may have no security at all. For example, many users use a Virtual Private Network (VPN) to create an encrypted "tunnel" between their laptop computer and an enterprise server or firewall. Unfortunately, such VPNs may not be able to be used with some common user devices such as PDA's, iPADS, cell phones, or the like. Some users use Windows or Linux based software such as Pretty Good Privacy (PGP) to encrypt email communications, but that software may not be available for use on other portable devices.

Figure 1:
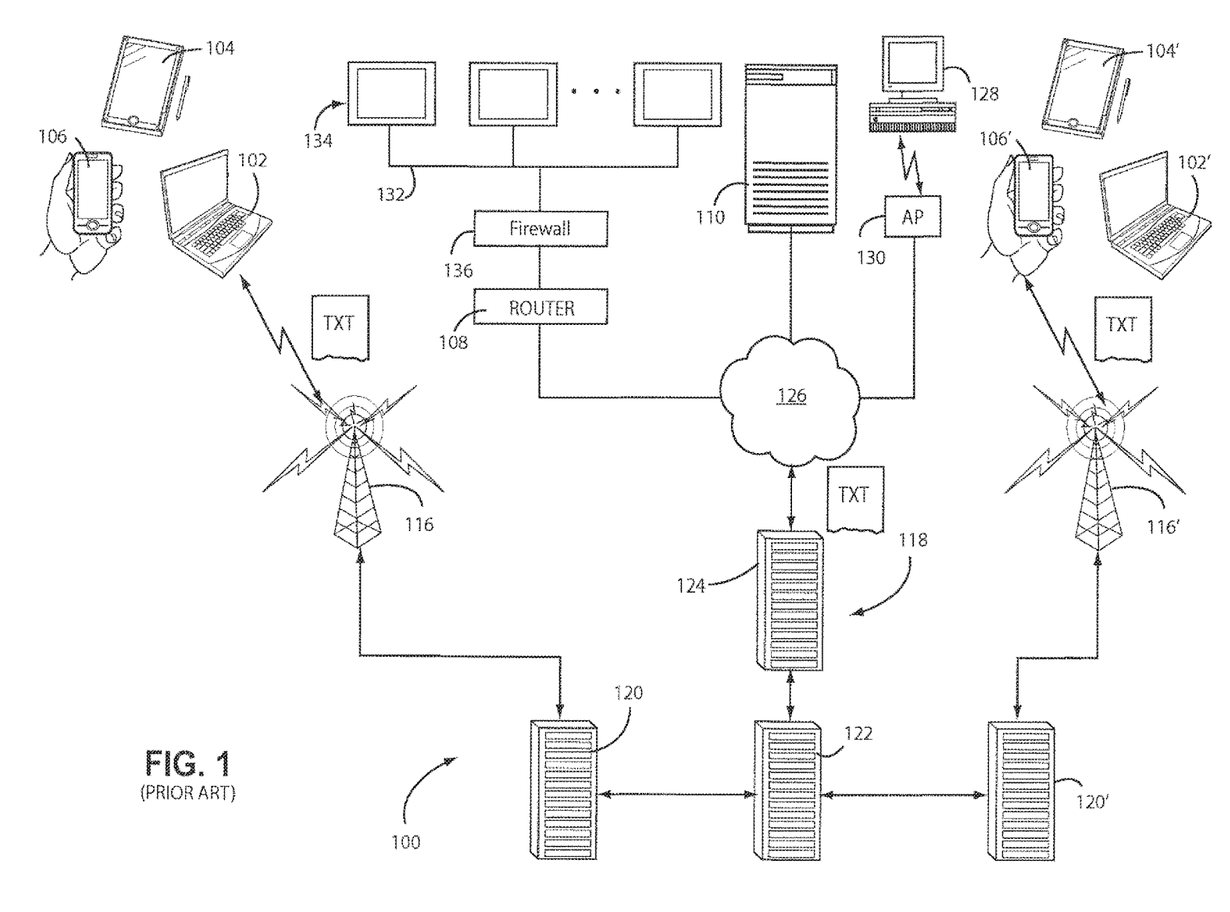
FIG. 1 schematically illustrates an exemplary illustrative non-limiting prior art conventional text or other messaging communication system.

In more detail, FIG. 1 shows an exemplary illustrative non-limiting prior art system or architecture for conveying messages between end-user devices. System 100 can be used with a variety of different kinds of end user or other devices (see e.g., FIG. 1A) including for example wireless or wired laptop computers 102, tablet computers 104, personal digital assistants or cell phones 106, routers 108, or virtually any other kind of device. Any such devices may have a need to communicate messages to any other such device.

In the particular example shown in FIG. 1, wireless connectivity is established between an end-user device such as tablet computer 104 and a personal digital assistant or cell phone 106' via a wireless communications infrastructure such as for example cellular telephone or other wireless transceivers linked together by various computers 118. Computers 118 may include for example, one or more mobile switching centers 120, a short or other message service center 122, and one or more gateway mobile or other switching centers 124. Gateway 124 can provide connectivity via the Internet 126 or other networks with a variety of other wide or local area networks including but not limited to for example a directly-connected server 110, a computing device 128 linked by a hotspot or other access point 130; a local area network 132 connecting multiple computing devices 134 via a firewall 136 and router 108, or any other well known data communications infrastructure.

Briefly, in the example shown in FIG. 1, an end-user device such as 106 generates a message in a particular format. Such message may be formatted as for example an SMS (short message service) or so-called "text" message, a multi-media service (MMS) message, an email, a photograph or graphic, a Word document or other word processing file, a Power Point document, or any other desired format. The user of device 106 wishes to send this message to the user of another end-user device such as device 102' via data communications system 100. Assuming appropriate subscriptions, access permissions and the like are provided and in place, it is no problem for the end user of device 106 to appropriately address the message to the end user of device 102' and transmit it wireless or wired via system 100 for conveyance to the end user of device 102'. In a similar way, messages and data can be exchanged throughout system 100 between the various devices shown.

Figure 2:
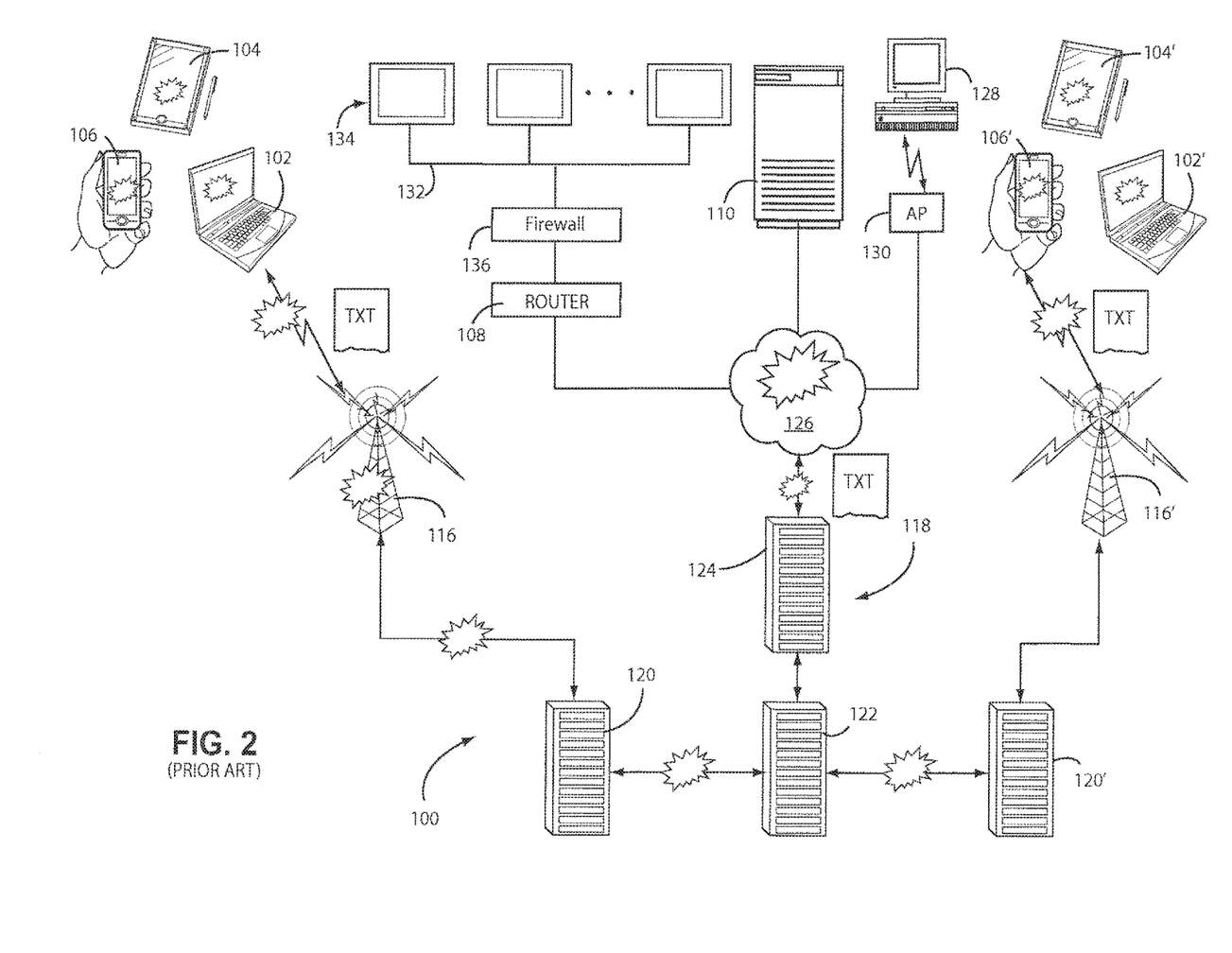
FIG. 2 shows multiple vulnerabilities present in the FIG. 1 prior art system.

A problem arises however when an attacker wishes to receive or eavesdrop on the transmitted message without authorization. For example, suppose the end user of device 106 is a law enforcement officer who wishes to notify headquarters of her current location. Such location information would be very useful for a terrorist who wishes to attack and evade detection, or for a criminal who wishes to burglarize a residence without being caught. Similarly, if the end user of device 106 is making a social engagement, a stalker who reads the message may be able to use the intercepted information to threaten the life, limb or property of the user. If the user is exchanging sensitive personal information such as credit card or other financial information or other information that the user does not wish to become widely known or publicly available, the end user may be fooled into thinking that system 100 communicates messages relatively securely. In fact, conventional communications systems such as 100 are highly vulnerable to attack, as FIG. 2 shows.

Unfortunately, nearly every communications link and computer within system 100 can be an entry point for an attacker wishing to intercept and eavesdrop on messages being exchanged between the end user of device 106 and the end user of device 102'. Unauthorized software present on the various devices shown such as viruses can intercept exchange messages and send them to unauthorized individuals. The wireless connections themselves, if used, provide an easy way for any individual with the appropriate equipment to listen in on data communications. The Internet or other network 126 may be a public network that provides ample opportunities for spoofers or other attackers to insert equipment that stores copies of messages being passed and allows the attacker to read them or glean other information from them. The end result is a highly insecure system that has the potential of compromising virtually any message sent across it.

Techniques are currently known for providing additional security in the context of system 100, but generally speaking, such security requires either proprietary devices or software, intermediary computers or other infrastructures or both. For example, some end-user devices 106 such as BlackBerries® have built-in encryption capabilities that encrypt data communications with other BlackBerries®. However, generally speaking, such a solution requires an enterprise server or other infrastructure and is also limited to secure communications between like devices. For example, when sending an SMS or text message from a wireless BlackBerry® to a cellular telephone or a laptop computer, there is generally no way to encrypt the message for security purposes. Other known solutions install special proprietary software on the end-user devices (e.g., Pretty Good Privacy) but such solutions tend to work only with more capable devices such as laptops or netbooks and are not available for the wire variety of less-capable or different devices such as personal digital assistants, cellular telephones, music players, remote control devices, etc.

If secure encryption is not readily available and easy or almost automatic to activate, it is almost inevitable that a user will eventually send sensitive personal, business or other information in clear text form, thereby potentially compromising the information to attackers, spoofers and eavesdroppers. What is needed is a convenient, easy to use, ubiquitous, automatic secure communications capability that can automatically encrypt and decrypt messages over a wide variety of platforms without requiring any special intermediating security components such as gateways, proxy servers or the like. Trusted (verified) and secure (protected) applications are a huge opportunity in the mobile workforce market. Trusted/secure applications for the mobile workforce can significantly improve productivity and effectiveness, while enhancing personal and organizational security and safety.

Example non-exhaustive non-limiting features and advantages of exemplary illustrative non-limiting implementations include:

User selects "Secure" for transmission—no other unique user interaction required Transmissions are kept encrypted unless being viewed Transmission may have durations placed on them such that after a specific length of time they can no longer be decrypted/viewed Encryption and Keys will be standards based (unless otherwise selected by the organization)

User Public/Private key pair is auto generated by the application upon installation Key Rings are only limited by available device memory Keys maybe used on multiple mobile devices Optionally, an organization can elect to use a separate Key management system other than the one on the device. Does not require an intermediary Key server Able to secure applications that are currently used by literally millions of workers daily. Possible to take these applications and add security which will be ubiquitous and almost invisible to the user A Trusted Short Messaging Service (commonly know as "text" for the Blackberry, iPhone, WinMo, Android and other platforms. While it will not prevent the intercept of the Text Message, it WILL prevent anyone from reading it. This has applications for Law Enforcement (FBI, DEA, ATF, etc), DoD, Law Makers (Senate, House, White House), DoJ, TSA, Customs & Boarder, —any agency which has sensitive information Key Management And Modular Encryption Example Market Applications:

Operational on Blackberry 8300 (the primary US Government Model of Phone) and subsequent Models as one example Modular Solution Architecture—using the existing device encryption; AES which can be a default; or install an encryption capability can be supplied by the customer or user Over-The-Air (OTA) Flexible Key management system (keys may be changed at anytime)

- Optional Central Key management system—each agency can manage their own keys
- No Gateways required in some embodiments
- Revocation of Keys over the air
- Auto Sync with Computer
- Contact list selection for To:
- Contact list annotation of secure receive capability per individual
- Simple to use management console for a) Key distribution, b) key management and c) Phone wipe
- Implement the ability to wipe the SMS messages over-the-air (OTA)
- Implement the ability to wipe the phone (all applications and data) OTA
- Trusted and Secure Multimedia Messaging Service (MMS—the ability to send pictures, voice and files direct without email servers)
- Fully protected image attachment from camera
- Fully protected file attachment
- Instant Messaging Secure Communications Chat Application
- Secure Communications between laptops/notebooks/netbooks/slates/tablets/phones/desktops/or any other device
- Invisible to the user for use, but can supply a visual indicator that the security is in force—such as a lock image or change in color of the screen
- Instant security
- Router enabled
- Wired or wireless (WiFi, 3G, 4G)
- Possible to architect and develop specialized applications for Government users as custom solutions
- An email App can encrypt the body and attachments of an e-mail
- Email App can send the encrypted e-mail through the users e-mail system
- No Central or specialized server required
- Encryption of files on the phone or laptop
- Provides compatibility between mobile phones, mobile computers and office computers
- Encryption of Pictures
- Compressed and Encrypted
- Encryption of Video
- Compressed and Encrypted Example Peer-to-Peer Secure-SMS
- With no server involved, the encryption is between two peers and be fully protected end-to-end
- Using Public/Private key pairs are generated in the device itself by the application and can be changed at any time
- Once a device has established its own Public/Private key pair, it can send an SMS message to the other side in effect saying: "here's my public key". The receiving side can be presented a message "Bob wants to exchange keys with you, ok?". If Alice says "ok," then her application accepts Bob's public key and returns Alice's public key to Bob. Now the two can send each other secure messages in the future as each has added the other to their key ring Example Management System
- Provides a management system wherein the management system can generate public/private key pairs along with a enterprise identity for a registered user, delivering them securely to each registered end-point
- Distribution can be done remotely
- Once the keys are established, the same procedure as the Peer-to-Peer secure SMS exchange can be followed except that if Alice doesn't have the same enterprise hash present in her key ring, she couldn't accept Bob's Public Key and thus secure communications using the enterprise keys would not be possible. This system would always be peer-to-peer but rely on a secondary enterprise hash to ensure that the peer-to-peer 'club' is restricted to members only
- Key timeout, message expiration etc. Timing can be established such that every message can expire and virtually become unreadable—the length of time can be set by the user or by the enterprise
- Plug-in encryption modules: allows for interchangeable encryption modules that would permit higher-strength or different strength encryption to meet an enterprise requirement Example Peer to Peer Encrypted Communications
- Independent of the transport (communications medium—cellular, internet, satellite, etc)
- Secure Text messaging (SMS—Short Message Service) without server/intermediary devices
- Stealth Mode for text messaging
- Steganography for additional protection and compression
- Enterprise Key Management System Option
- Secure E-mail
- Secure Multimedia Messaging System (MMS)
- Secure Tweets
- Secure Chat
- Secure Instant Messaging (IM)
- No Intermediary Device (server, host, etc) required for secure transmission
- Fully Protected from the Mobile Device to the Mobile Device
- Storage or memory is use to maintain the data structures, messages and applications
- The Processor executes the application from memory Example Devices
- Mobile Devices—Phones/PDAs
- Netbooks/Laptops/Notebooks
- Mobile Devices—Pads/Slates/Tablets
- Routers—wired/wireless
- Other Machines—soda, rental, etc
- User Interfaces can be unique to each manufacturer's specification; however, can provide the same user experience as their standard communications devices
- The Text Writing Module can use the same module as the standard message system uses
- The Cryptographic interface is designed to allow multiple cryptographic modules to be used, allowing the cryptology used to be changed without major changes to the applications; this provides for companies, governments, agencies to use different cryptographic algorithms such as AES 256, AES 128, RSA, Blowfish, IDEA, etc.
- The Ciphertext—which what is generated when plain message is converted via encryption—will be compatible with ASCII Text such as ASCII/128 for subsequent transmission enabling communications through most environments. Other transforms such as compression are possible based on the communications conditions or requirements.
- User selects "Secure" for transmission—no other unique user interaction required
- Transmissions are kept encrypted unless being viewed
- Transmission may have durations placed on them such that after a specific length of time they can no longer be decrypted/viewed
- Encryption and Keys standards based (unless otherwise selected by the user or organization)

User Public/Private key pair is auto generated by the application upon installation Key Rings are only limited by available device memory Keys maybe used on multiple mobile devices Optionally, an organization can elect to use a separate Key management system other than the one on the device

BRIEF DESCRIPTION OF THE DRAWINGS

These and other features and advantages will be better and more completely understood by referring to the following detailed description of exemplary non-limiting illustrative embodiments in conjunction with the drawings of which.

DETAILED DESCRIPTION OF EXAMPLE NON-LIMITING IMPLEMENTATIONS

Figure 1A:
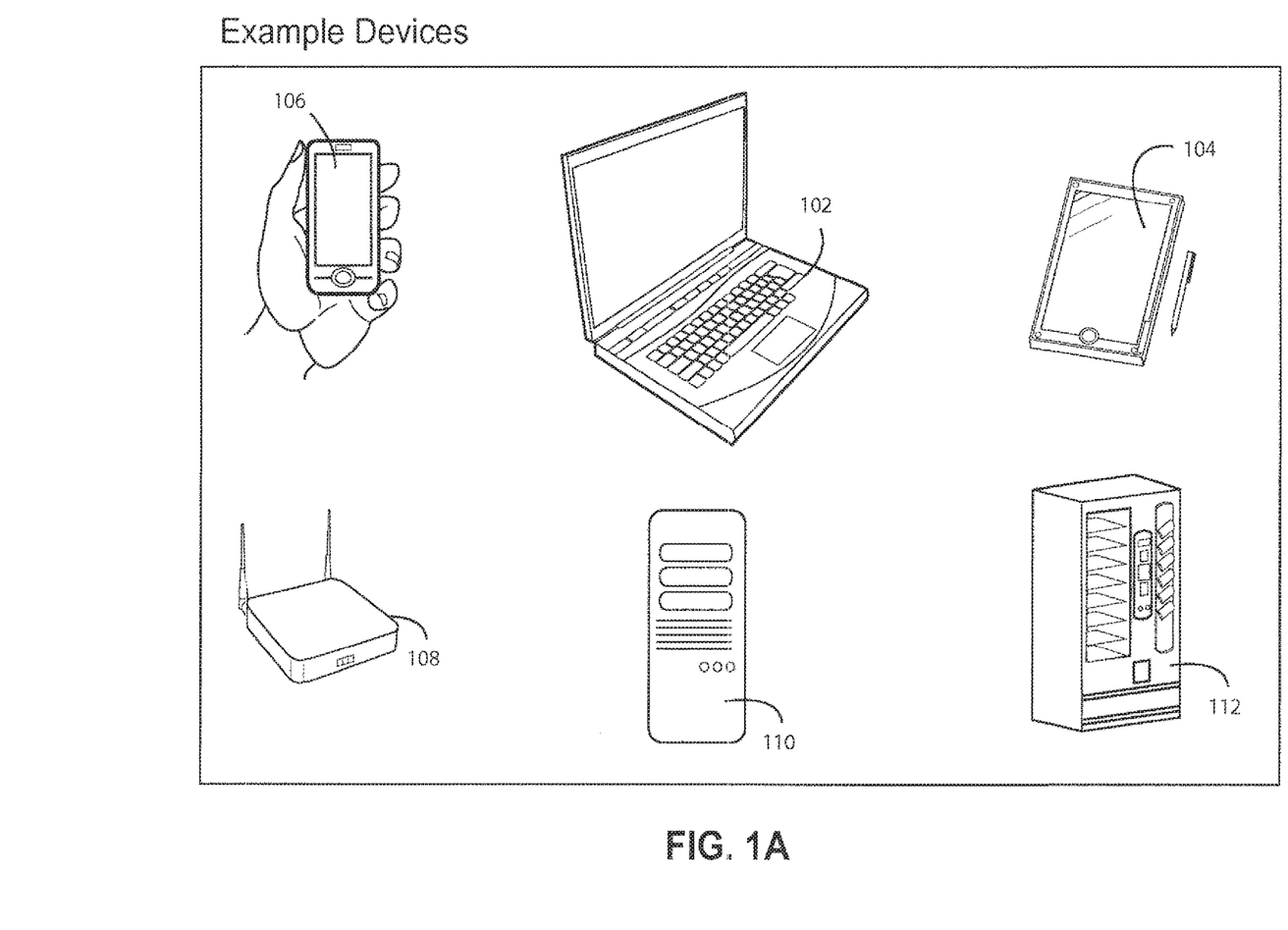
FIG. 1A shows non-exhaustive examples of end user or other devices that can be employed.
Figure 3:
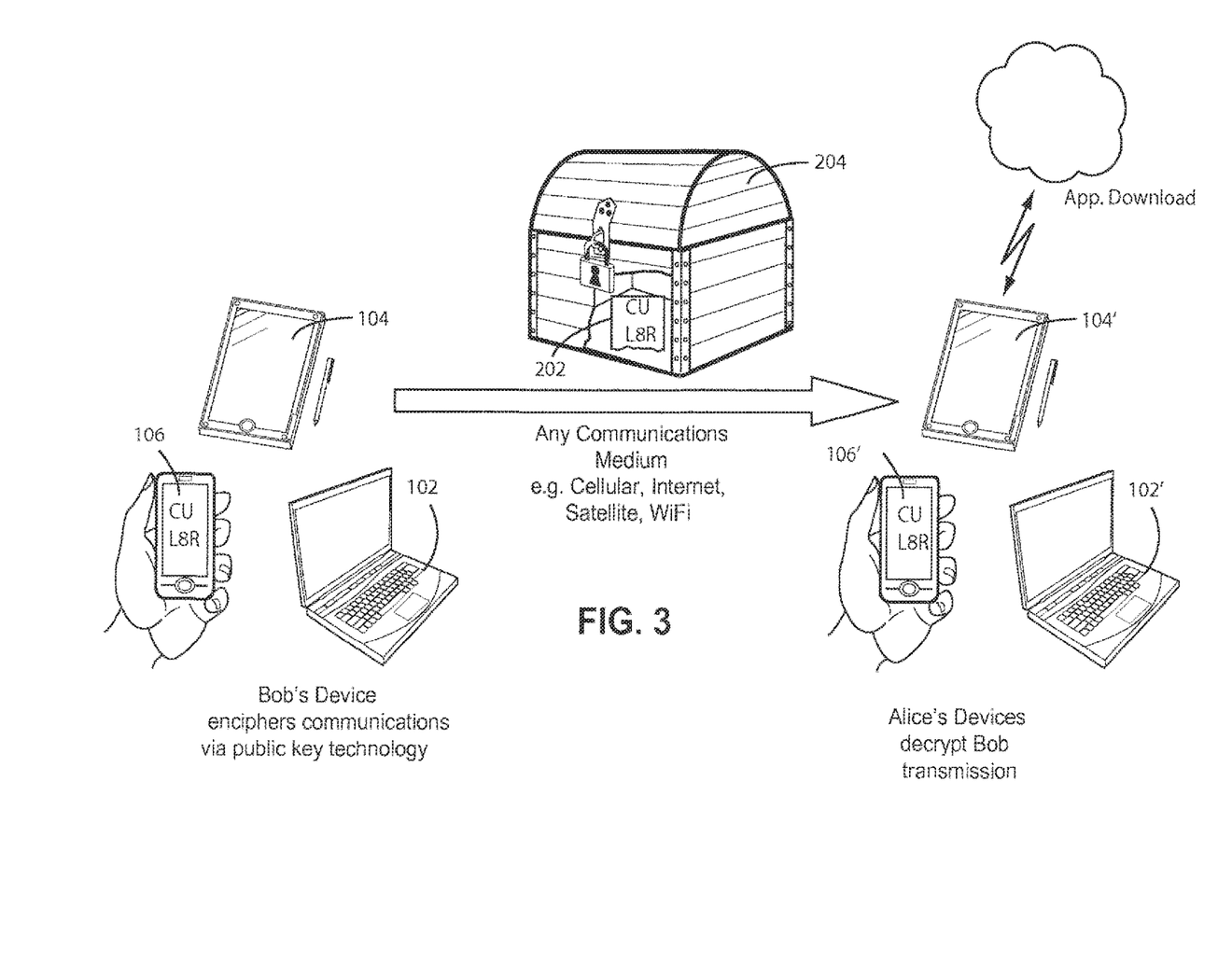
FIG. 3 shows one way that end-to-end security can be provided irrespective of the communications medium and without requiring any intermediary device for secure transmissions.

FIG. 3 shows an exemplary illustrative non-limiting implementation that provides secure communications between end-user device 106 and end-user device 102' (or 106') without requiring any intermediary device such as a server, host, etc., for secure transmission and which can work over any communications medium (e.g., cellular, Internet, satellite, Wi-Fi, etc.) and with virtually any user device including those shown in FIG. 1A. In the example shown, the end-user devices 102, 104, 106 are used by an end user named "Bob," and end-user devices 102', 104', 106' are used by an end user "Alice." Bob wishes to send a secure communication to Alice. Conventionally, it is known for Bob's device 106 to encrypt the message to an encryption key known by Alice's device 106, (e.g., Alice's public key) before sending the message. In this drawing, the message that Bob wishes to send ("C U L8R") 202 is thus encrypted by Bob's device 106 using Alice's public key (as represented by the lockbox 204). When Alice's device 106' receives the encrypted message, Alice's device can open the lockbox 204 by decrypting using Alice's corresponding private key in order to read and display the message 202. The problem arises if Alice's device 106'—like most portable devices in the world today—have no capability to encrypt and decrypt messages, or have only proprietary encryption/decryption solutions that cannot be used for the free exchange of texts or other messages over public networks. In this instance, the exemplary illustrative non-limiting implementation provides a download-on-demand application and associated protocol that allows any device such as those shown in FIG. 1A to quickly download an application that can coexist with other applications on the end-user device 106' without interfering with those other applications, and which can be used to immediately begin decrypting and encrypting messages.

Figure 4A:
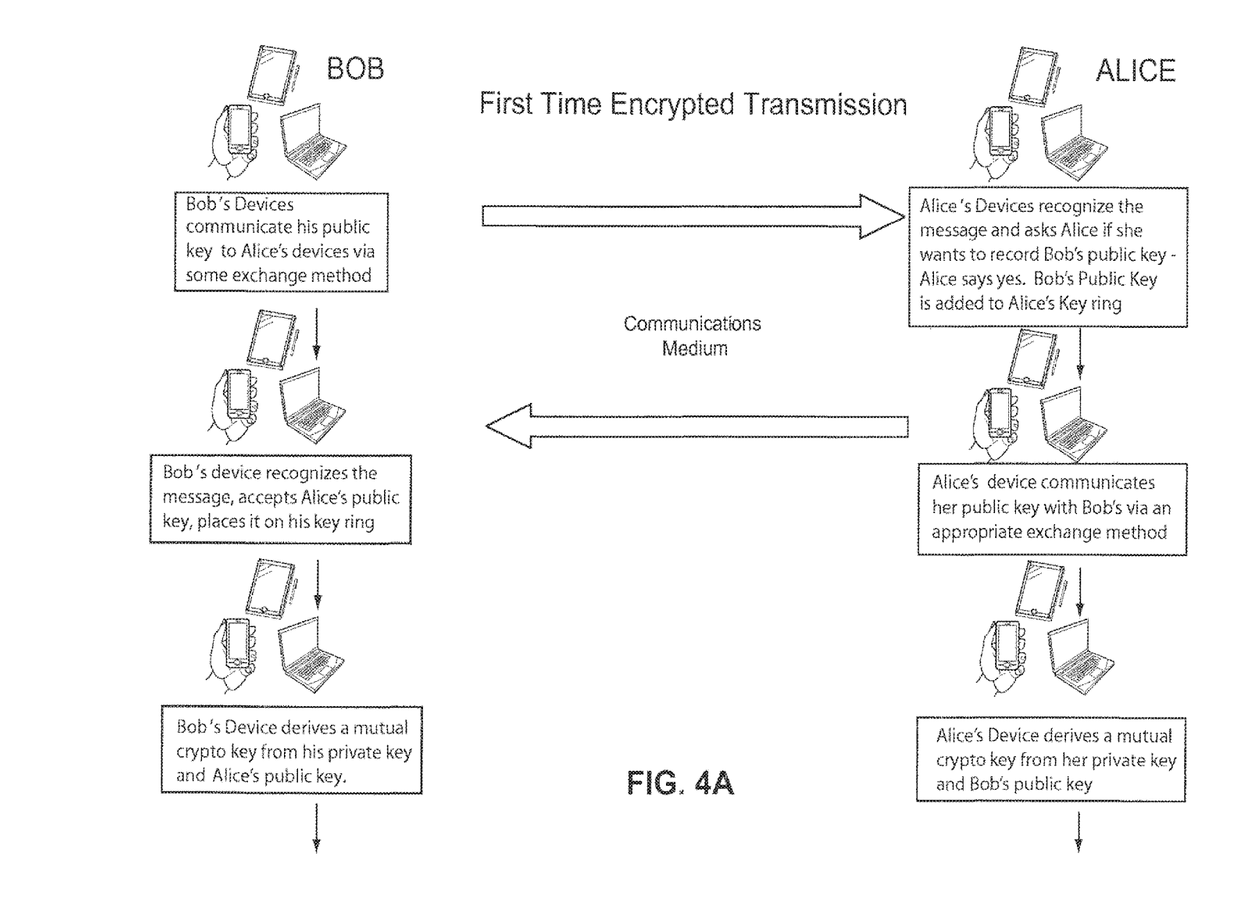
FIGS. 4A, 4B show an exemplary illustrative non-limiting protocol and flow arrangement for establishing secure communications between two end-user devices.
Figure 4B:
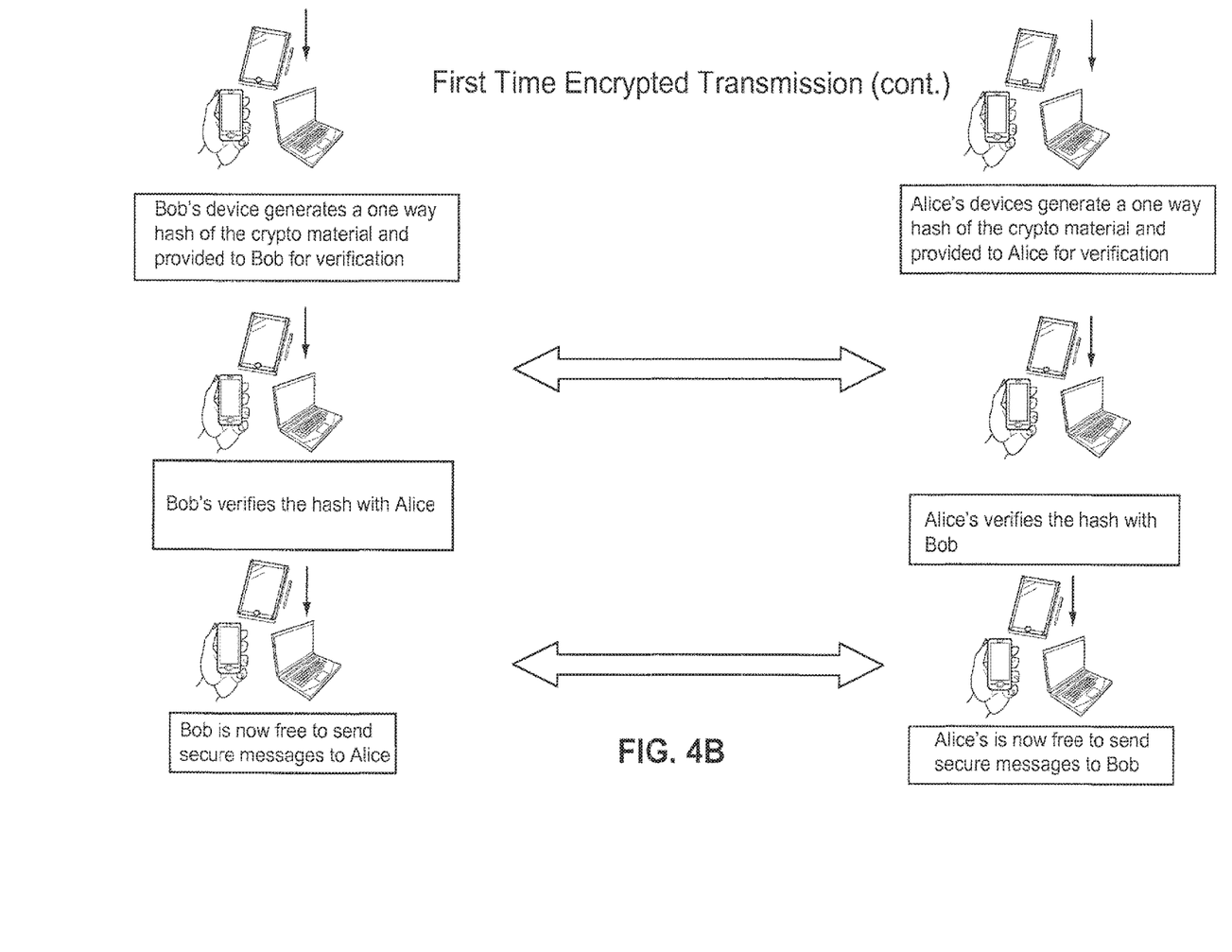

FIGS. 4A, 4B show an example first time encrypted transmission protocol that can be used. In the examples shown, Bob's end-user device 106 communicates his public key to Alice's device via some exchange method. The communications medium used can be any desired medium (e.g., cellular, Internet, SMS, Satellite, WiFi, Bluetooth, Token exchange, Email, VCF, other acceptable in/out-of-band methodology, etc. The offer may be time limited and may be facilitated by a trusted third party. Bob's public key can be made public without comprising security because, as is known to those skilled in the art, it is computationally infeasible to derive Bob's private key from his public key.

Upon receiving this message, Alice's device 106' may not know how to handle it. If this is the first time Alice's device 106' has received a secure message, it may need to be prepared—in the exemplary illustrative implementation by downloading an application on demand from the Internet 126 or via system 100 or otherwise. This download can be provided in any number of ways such as via iTunes, web server, or any other desired arrangement. This download can be prompted by including clear text in the message that Bob's device 106 sends to Alice that says for example:

Bob wishes to send you an encrypted text message. Do you want to receive it? If so, please download the following application from this network location: [specify name/network address/URL, etc.]

Upon receiving this message, if Alice wishes to proceed, she can control her device 106' to download the application, possibly incurring a license fee charge to her cellular telephone or wireless account or iTunes account or the like. The download server can detect the type of device Alice is using and download code that is able to run on Alice's device. Of course, if Alice's device 106' already has this code resident, there is no need for it to download a new code, although in some instances receipt of the message may trigger Alice's device 106' to download an update if one is available.

When the application first becomes resident on Alice's end-user device, it may automatically generates a private key for Alice's end-user device 106' using conventional technology (e.g., by using random or pseudo random information already present on and/or which can be generated by Alice's device). The downloaded application at the same time generates a corresponding public key and stores both on Alice's device 106' key ring.

Once Alice's device 106' has appropriate software resident, it recognizes the message and asks Alice if she wants to record Bob's public key. If Alice says yes, Bob's Public Key is added to Alice's Key ring. Alice's device then communicates her public key with Bob's via an appropriate exchange method as described above. Bob's device recognizes the message, accepts Alice's public key, places it on his key ring. Bob's device then derives a mutual cryptographic key ("shared secret") from his private and Alice's public key. Alice's device also derives a mutual cryptographic key (the same "shared secret") from her private and Bob's public key. Bob's device generates a one way hash of the crypto material and provided to Bob for verification. Alice's device also generates a one way hash of the crypto material and provided to Alice for verification. Bob's device verifies the hash with Alice and Alice's device verifies the hash with Bob using any desired communications means (e.g., Cellular, Internet, Satellite, WiFi, Bluetooth, Token exchange, Email, Voice, other acceptable in/out-of-band methodology, etc). Alternately, Bob and Alice can perform this exchange via e-mail, snail mail, PSTN, USB File exchange, etc. Once this two-way challenge-response verification protocol is complete, Bob is now free to send secure messages to Alice and Alice is now free to send secure messages to Bob.

For example, Bob's device 106 may now encrypt the text message with the shared secret before transmitting it to Alice's end-user device 106' as ciphertext. Upon receipt, Alice's end-user device 106' decrypts the ciphertext message using the shared secret for display. Similarly, Alice's device 106' may now also encrypt the text message with the shared secret before transmitting it to Bob's end-user device 106' as ciphertext. Upon receipt, Bob's end-user device 106' decrypts the ciphertext message using the shared secret for display or other functions or commands. All transmissions remain encrypted on the devices in the exemplary illustrative non-limiting implementation and are decrypted only for transitory display.

Thus, in this exchange, one does not need to use the public key to encrypt data in this type of exchange. One only uses it as a means to generate mutually derivable crypto material (shared secret) which will then be used as the basis to encipher the data to be communicated. Otherwise anyone who has the public key itself would be able to decipher the information. It is the pairing of Alice's private key and Bob's public key along with Bob's private key and Alice's public key that allows each side to derive the same unique mutual information used to derive the ultimate key. There is no need to encrypt the public keys. What happens is that once each side has the other's public key, they derive mutual crypto material. After that is derived, each side creates a hash of the crypto material or artifact of the derivation process and uses that to verify via some out of band method that the exchange was not intercepted by a malicious party.

In the exemplary illustrative non-limiting implementation, Bob and Alice first exchange their PUBLIC keys. Their PRIVATE keys are always kept private. On receipt of Bob's PUBLIC key, Alice can choose to "accept" Bob's PUBLIC key. If she does, she can now send to Bob her PUBLIC key encrypted with Bob's PUBLIC key. Assuming that the key exchange was not intercepted initially, only BOB can get Alice's PUBLIC key and trust that it came from Alice. Once each side has verified the other's PUBLIC key, then they each generate a mutual cryptographic key from their PRIVATE key and the other's PUBLIC key. This generates a unique key between the two parties. For added security, the device on each side generates a one-way hash of the crypto material and Bob & Alice can verbally (or otherwise) verify the hash. If verified, secure communications can begin. Alice's PUBLIC key is public but by encrypting it with Bob's Public Key, only Bob can decrypt Alice's message and therefore at least partially verify this came from Alice who had Bob's Public key. Once Bob & Alice have exchanged PUBLIC keys, each can generate a new cryptographic key that is derived from their PRIVATE key and the other's PUBLIC key. That is the key that is then used for sending secure SMS. This is thus an abstraction layer above the Public/Private key pair in the exemplary illustrative non-limiting implementation.

Figure 5:
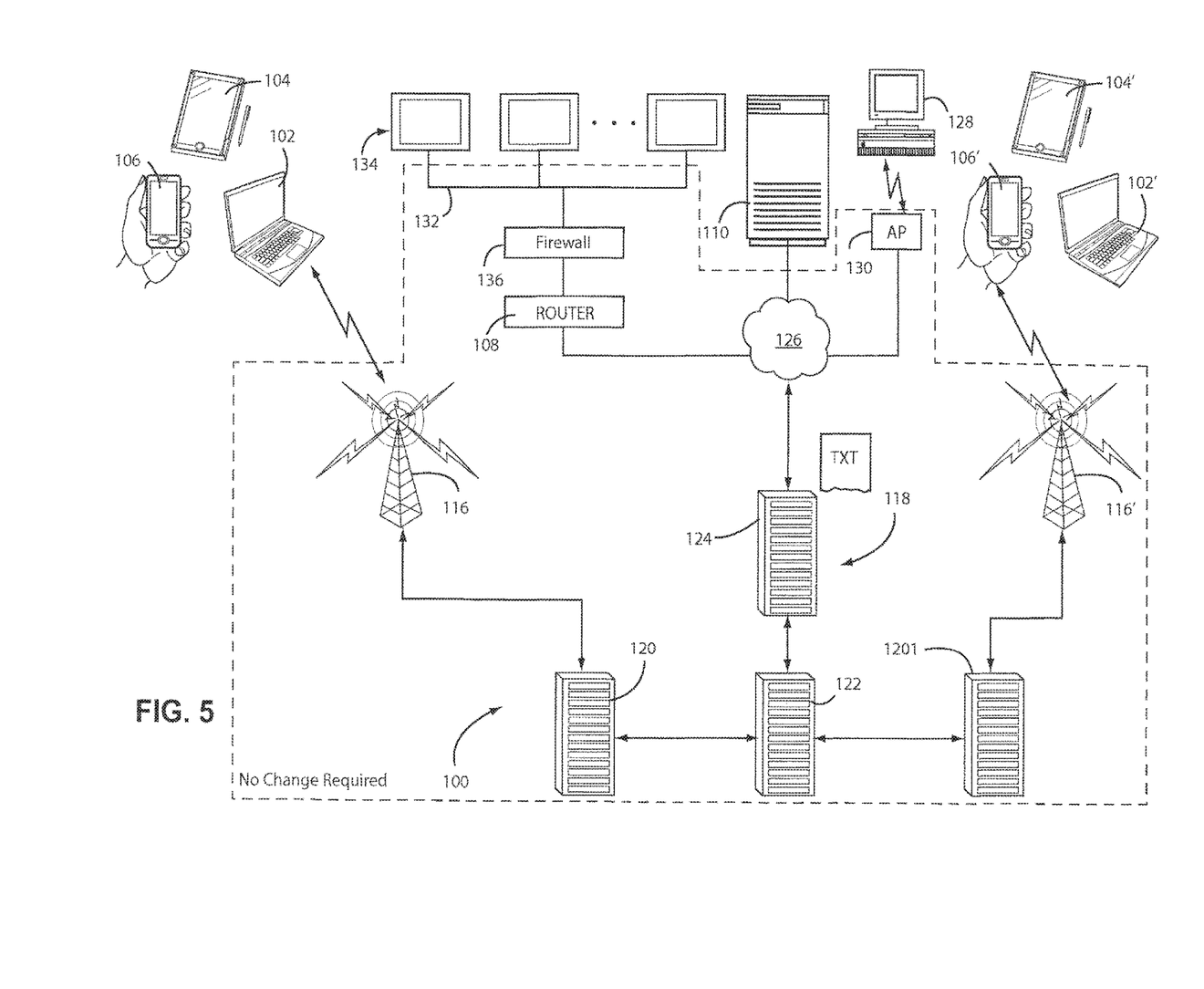
FIG. 5 shows how the FIGS. 4A, 4B arrangement does not impact or require any changes to the communication infrastructure while nevertheless providing end-to-end security.

As FIG. 5 shows, the encrypted forms of communication shown in FIGS. 4A, 4B are all fully supported by existing infrastructure in the exemplary illustrative non-limiting implementation. No modification to infrastructure 100 is required, since all of the messaging shown in FIGS. 4A, 4B follows the format or and appears to be a conventional SMS or other message. Because end-to-end encryption is provided, however, the security threats shown in FIG. 2 are eliminated. Even if an eavesdropper or attacker is able to intercept a message, he will not be able to open or read it because it is securely encrypted.

Figure 5A:
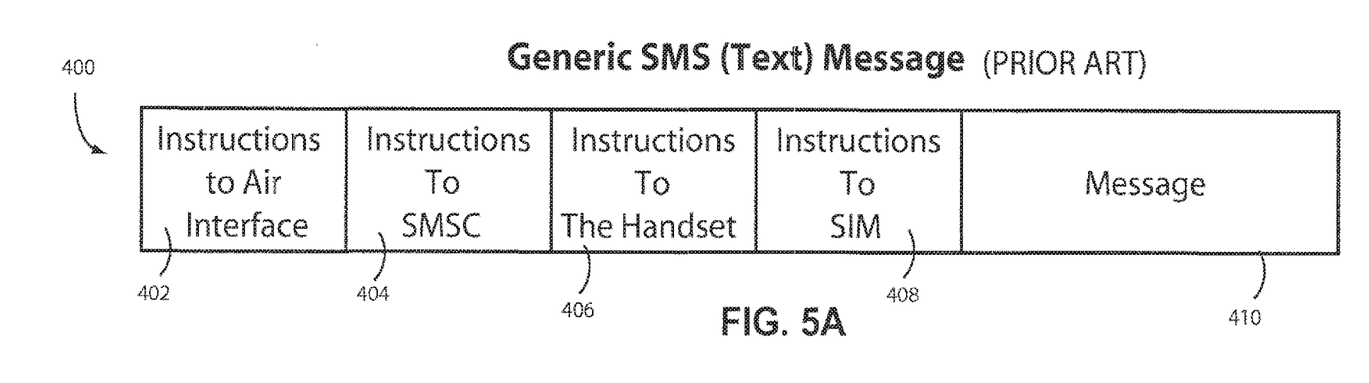
FIGS. 5A-5B show example message transmission protocols.
Figure 5B:
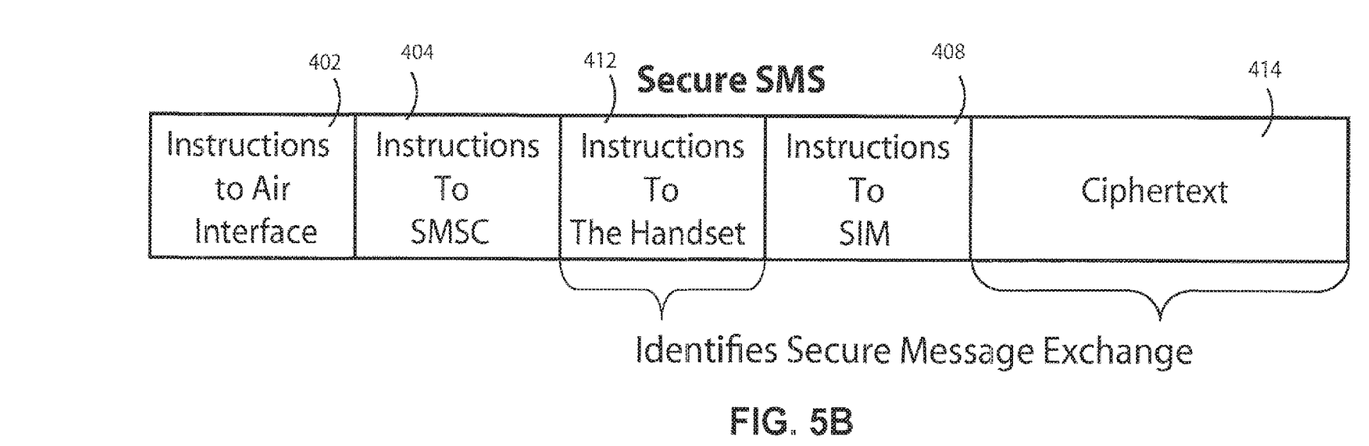
Figure 6A:
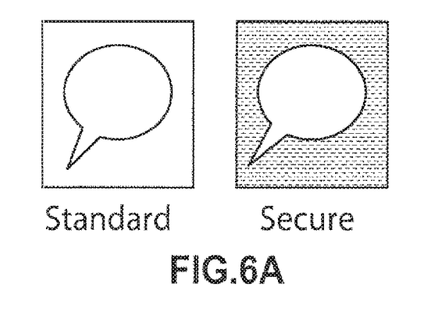
FIGS. 6A-6D show exemplary illustrative non-limiting user interface selection arrangements.
Figure 6B:
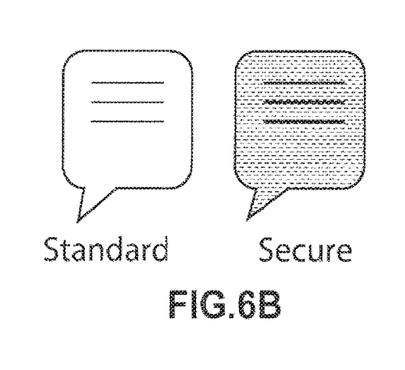
Figure 6C:
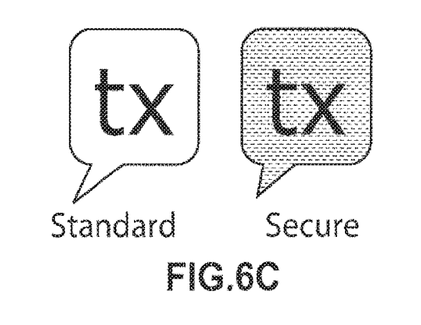
Figure 6D:
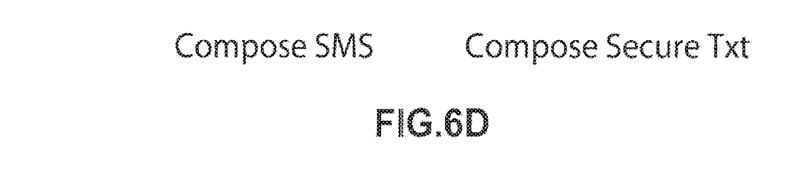

FIGS. 5A and 5B show how the FIGS. 4A, 4B protocol can be used to provide secure messaging that is fully compatible with existing infrastructure 100. FIG. 5A shows a generic SMS (text) message 400 including for example the following fields:

instructions to air interface 402
instructions to SMSC 404
instructions to handset 406
instructions to SIM 408
message or payload 410.

As FIG. 5B shows, the routing fields 402, 404, 408 may be sent unchanged in order to provide full compatibility with the existing infrastructure. However, for example, some or all of the "instructions to the handset" field 406 may be modified to provide an enhanced field 412 that instructs receiving end-user device 106' that the just-received message is encrypted. In addition, the clear text message may be replaced by a ciphertext message that can be opened, as explained above only with the appropriate private key.

FIGS. 6A-6D show example user interfaces that may be displayed by end-user devices to provide normal and secure options. In one exemplary illustrative non-limiting implementation, the secure option may be identical to the normal option already available on conventional devices except that it colors the icon red or some other distinctive color. This allows the user to easily select secure or non-secure communications with a simple touch of a button or tap of a stylus. In other examples, distinctive secure icons showing a padlock or which use the word "secure" may be provided. To send a secure message, the user simply selects the secure icon; to send a typical insecure message, the end user selects the standard icon.

Figure 7:
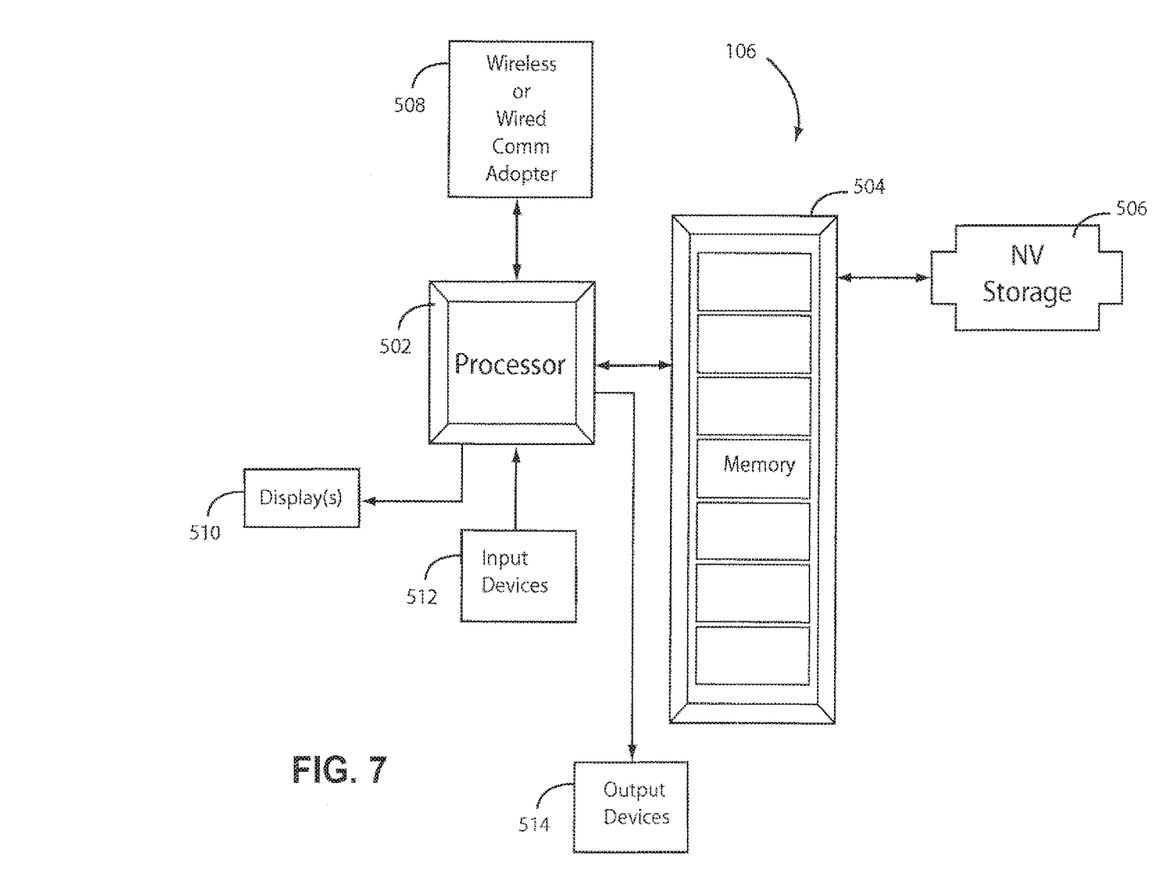
FIG. 7 shows an exemplary illustrative non-limiting end-user device architecture.

FIG. 7 shows an exemplary illustrative non-limiting end-user device 106 including, for example, a processor 502, a memory 504, and non-volatile storage 506. In the example shown, the processor 502 communicates with memory 504, and non-volatile storage 506 may also communicate with the processor either directly or through memory 504. The processor may communicate with the outside world via a wireless or wired communications adapter 508. A user may communicate with device 106 through a user interface provided for example by display or displays 510, input devices 512 and output devices 514. The display or displays 510 may comprise for example liquid crystal displays, plasma displays, rasterized displays, touch screens, or any other variation or other conventional display device. Input devices may include input keys, touch screen keys, pushbuttons, virtual buttons displayed on a touchscreen, voice activated commands, accelerometers or other motion detectors, light sensors (with or without pattern recognition capabilities), barcode readers, or any other device capable of conveying information to processor 502. Output devices 514 may include indicator lights, audio speakers, laser outputs, tactile output devices, printers, light projectors, feedback devices or any other output device desirable to provide a humanly perceivable or other output indicia.

Figure 8A:
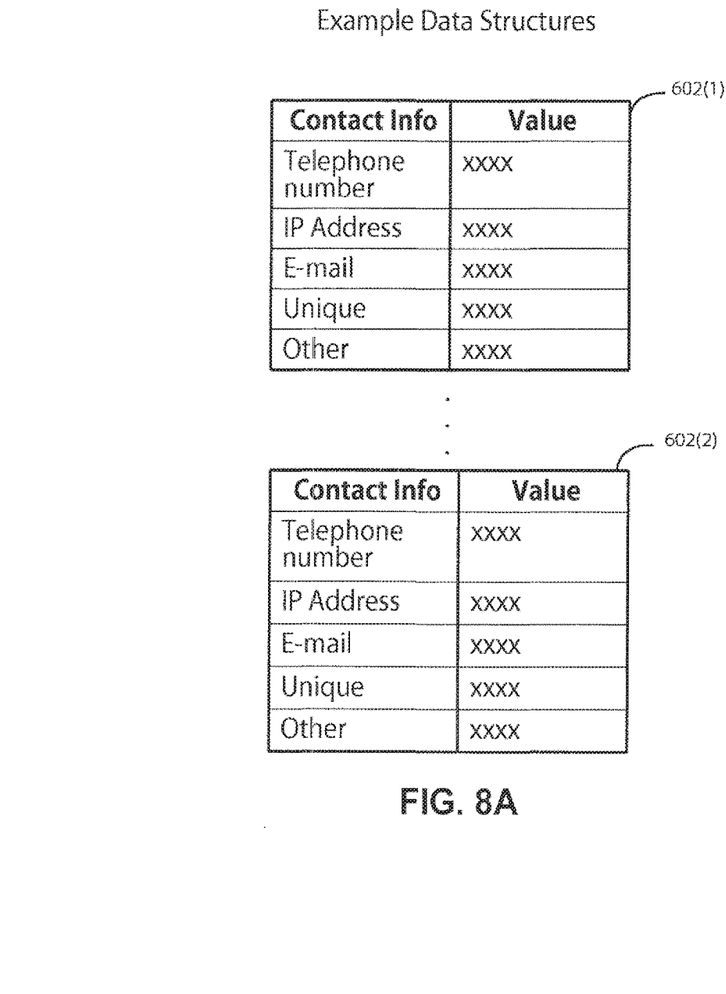
FIGS. 8A, 8B show example non-limiting data structures.
Figure 8B:
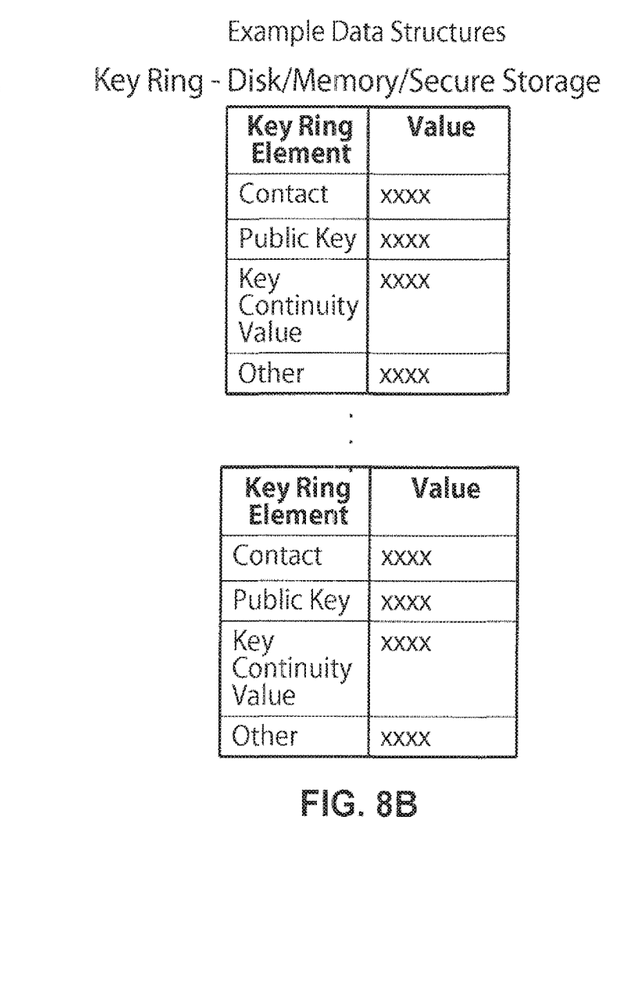

In the example shown, the memory 504 may contain a variety of programs and data for manipulation and/or execution by processor 502. Non-volatile storage 506 (which in some exemplary or illustrative implementations may comprise a SIM card, SD card, magnetic disk, optical memory, flash memory, Disk, EPROM, PROM, SSD or any other non-volatile storage device) may supply programs including the application mentioned above to memory 504 for execution by processor 502. Storage or memory is used to maintain the data structures, messages and applications, and the processor executes the application from memory. For example, memory 504 in conjunction with non-volatile storage 506 may store data structures such as shown in FIGS. 8A, 8B that link user identification information (e.g., telephone number, IP address, email address, name, other unique or non-unique identifier) with associated public keys. Any number of such records 602 may be stored in non-volatile storage 506 and/or memory 504. Different public keys can be associated with different applications if desired, so that for example one public key could be used to communicate with Alice securely via texting, while a different public key could be used for communicating with her via her IP address, etc. Additional data structures stored in the memory may comprise a key ring (e.g., in disk/memory/secure storage) that includes one or a plurality of key ring elements, each comprising for example Contact, Public Key, Key Continuity Value, Other).

Figure 9:
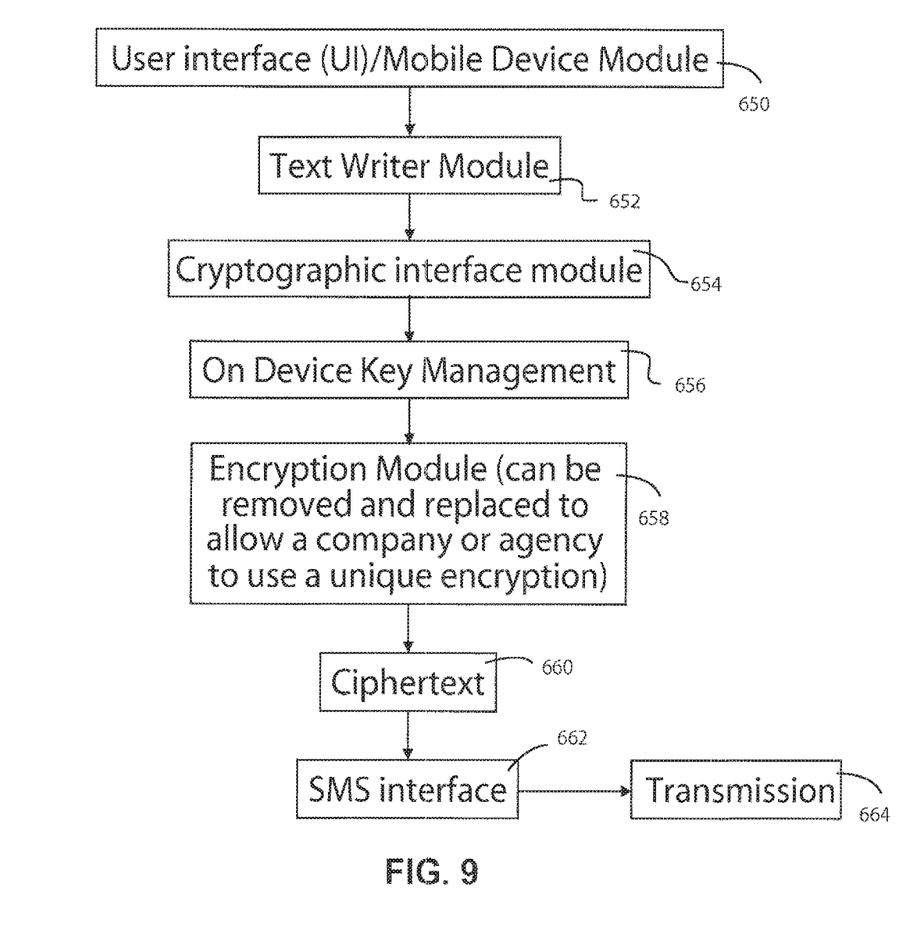
FIG. 9 shows an exemplary illustrative non-limiting flowchart of program control steps.

FIG. 9 shows an exemplary illustrative non-limiting flowchart of program control steps performed by processor 502 to implement the technology described herein. FIG. 9 also shows a software architecture/structure that an application stored in memory 504 may define for execution by and control of processor 502. In the example shown, a user interface module 650 may communicate with at text writer module 652 to allow the end user to compose a text or other message. The text writer module 652 may supply this conventional message to a cryptographic interface module 654 which uses on-device key management module 656 for managing public and private keys. An encryption module 658 may be used to encrypt the text or other message into cipher text 660. The encryption module may comprise any conventional encryption engine, including for example AES or the like. The encryption module can be removed and replaced to allow a company, agency or end user to use a unique encryption algorithm. A cipher text 660 in the exemplary illustrative non-limiting implementation is supplied to the SMS interface 662 for transmission 664.

While the technology herein has been described in connection with exemplary illustrative non-limiting embodiments, the invention is not to be limited by the disclosure. For example, while public key cryptography is described above in connection with exemplary illustrative non-limiting implementations, symmetric key cryptography, steganography, one time pad, or any other conventional technique using a shared secret to provide security may be used. While the exemplary illustrative non-limiting implementations are described in connection with wireless communications using SMS, any wired or wireless protocol using any messaging convention can be used. The invention is intended to be defined by the claims and to cover all corresponding and equivalent arrangements whether or not specifically disclosed herein.

What is claimed is:

1. A method of providing secure communications between a first end-user device and a second end user device, the method comprising performing the following at the second end user device:

upon the downloading of an application to the second device permitting the second device to decrypt a secure message sent by the first device, provisioning a Public/Private key pair including a public key associated with the second device;

receiving a message from the first device, said received message providing an indication that the first device wishes to send a secure message to the second device;

determining whether the second device is configured to communicate securely with the first device by use of the application downloaded to the second device permitting the second device to decrypt a secure message sent by the first device;

conditioned on determining that the second device is not configured to securely communicate with the first device, configuring to exchange clear text communications with the first device; and conditioned on determining that the second device is configured to securely communicate with the second device:

provisioning the second device with a public key associated with the first device;

agreeing with the first device upon, at least one shared secret derived from the provisioned public keys associated with the first and second devices;

receiving, from the first device, an encrypted message that can be decrypted by the second device using said shared secret; and upon processing the encrypted message, decrypting and providing clear text contents of the message to an end-user of the second device.

2. The method of claim 1 wherein said message comprises an SMS message.

3. The method of claim 1 further including encrypting using the shared secret, at the first device, an SMS message for decryption by the second device.

4. The method of claim 1 wherein the shared secret comprises a decryption key.

5. The method of claim 1 further including generating shared secret mutually derivable cryptographic material and using said material as a basis to encipher and decipher data to be communicated.

6. In a system for providing secure communications between end-user devices, a first device comprising:

a first device communications interface configured to communicate a message to a second device, said message providing an indication that the first device wishes to send a secure message to the second device; and a first device processor operatively coupled to the first device communications interface, the first device processor configured to determine whether the second device is configured to communicate securely with the first device by use of an application downloaded to the second device permitting the second device to decrypt a secure message sent by the first device, wherein upon the downloading of the application to the second device permitting the second device to decrypt a secure message sent by the first device, a Public/Private key pair including a public key associated with the second device is provisioned;

conditioned on determining that the second device is not configured to securely communicate with the first device, the first device processor configuring to exchange clear text communications between the first and second devices; and conditioned on determining that the second device is configured to securely communicate with the first device, the first device processor:
provisioning the second device with a public key associated with the first device;
agreeing upon at least one shared secret derived from the provisioned public keys associated with the first and second devices; and
communicating, to the second device, an encrypted message that can be decrypted by the second device using said shared secret for decrypting and providing in clear text to an end user of the second device.

7. The system of claim 6 wherein said message comprises an SMS message.

8. The system of claim 6 further including encrypting using the shared secret, at the first device, an SMS message for decryption by the second device.

9. The system of claim 6 wherein the first device communications interface comprises a wireless communications interface.

10. The system of claim 6 wherein the shared secret comprises a decryption key.

11. The system of claim 6 further including at least one cryptographic element that generates shared secret mutually derivable cryptographic material for use as a basis to encipher data to be communicated.

12. In a system for providing secure communications between end-user devices, a second device comprising:
a second device communications interface configured to receive a message from a first device, said message providing an indication that the first device wishes to send a secure message to the second device; and
a second device processor operatively coupled to the second device communications interface, the second device processor configured to download an application permitting the second device to decrypt a secure message sent by the first device;
the second device processor upon downloading the application to the second device permitting the second device to decrypt a secure message sent by the first device, provisioning a Public/Private key pair including a public key associated with the second device;
the second device processor being further configured to determine whether the second device is configured to communicate securely with the first device by use of the application downloaded to the second device permitting the second device to decrypt a secure message sent by the first device;
conditioned on determining that the second device is not configured to securely communicate with the first device, the second device processor being configured to exchange clear text communications between the first and second devices; and
conditioned on determining that the second device is configured to securely communicate with the first device, the second device processor further configuring to:
provision the second device with a public key associated with the first device;
agree with the first device upon at least one shared secret derived from the provisioned public keys associated with the first and second devices; and
receiving from the first device, an encrypted message that the second device can decrypt using said shared secret; and
upon processing the encrypted message, decrypting and providing clear text contents of the message to an end user of the second device.

13. The system of claim 12 wherein said message comprises an SMS message.

14. The system of claim 12 further including decrypting using the shared secret, at the second device, an SMS message encrypted by the first device.

15. The system of claim 12 wherein the second device communications interface comprises a wireless communications interface.

16. The system of claim 12 wherein the shared secret comprises a decryption key.

17. The system of claim 12 further including at least one cryptographic element configured to generate shared secret mutually derivable cryptographic material for use as a basis to decipher data to be communicated.

* * * * *